United States Patent [19]
Menzenski

[11] Patent Number: 6,123,260
[45] Date of Patent: Sep. 26, 2000

[54] FLAGGING UNVERIFIED CHECKS COMPRISING MICR INDICIA

[75] Inventor: Gregory Menzenski, Ithaca, N.Y.

[73] Assignee: Axiohm Transaction Solutions, Inc., Ithaca, N.Y.

[21] Appl. No.: 09/156,100

[22] Filed: Sep. 17, 1998

[51] Int. Cl.[7] ........................................ G06K 7/08
[52] U.S. Cl. .............................. 235/449; 235/493; 400/55
[58] Field of Search ........................... 235/449, 439, 235/486, 493, 470; 364/705.02; 271/902; 400/73, 55, 58

[56] References Cited

U.S. PATENT DOCUMENTS

| | | | |
|---|---|---|---|
| 4,080,528 | 3/1978 | Kao et al. | 235/449 |
| 4,541,334 | 9/1985 | Liedtke et al. | 400/154.3 X |
| 4,672,377 | 6/1987 | Murphy et al. | 235/375 X |
| 4,689,742 | 8/1987 | Troy et al. | 364/412 |
| 5,053,607 | 10/1991 | Carlson et al. | 235/379 |
| 5,276,608 | 1/1994 | Nakagawa et al. | 235/380 X |
| 5,371,798 | 12/1994 | McWhortor | 380/51 |
| 5,627,909 | 5/1997 | Blaylock et al. | 382/139 |
| 5,789,727 | 8/1998 | Teradaira et al. | 235/449 |
| 5,934,193 | 8/1999 | Menzenski | 101/287 |
| 5,965,862 | 10/1999 | Momose | 235/449 |
| 5,997,192 | 12/1999 | Martinez et al. | 400/88 |
| 6,003,763 | 12/1999 | Gallagher et al. | 235/379 |

*Primary Examiner*—Michael G Lee
*Attorney, Agent, or Firm*—Salzman & Levy

[57] ABSTRACT

A transaction printer includes the MICR encoding and reading of indicia at the point-of-sale. The printer reads the imprinted MICR indicia and determines whether the MICR indicia are verifiable. Unverified checks may be marked. An operator may be asked to determine whether a "bad" check (i.e., wrinkled, folded, torn, etc.) is the probable cause of the verification failure. If the check appears to be good, the MICR encoding function of the transaction printer may be disabled until a service technician is available to isolate the problem.

11 Claims, 6 Drawing Sheets

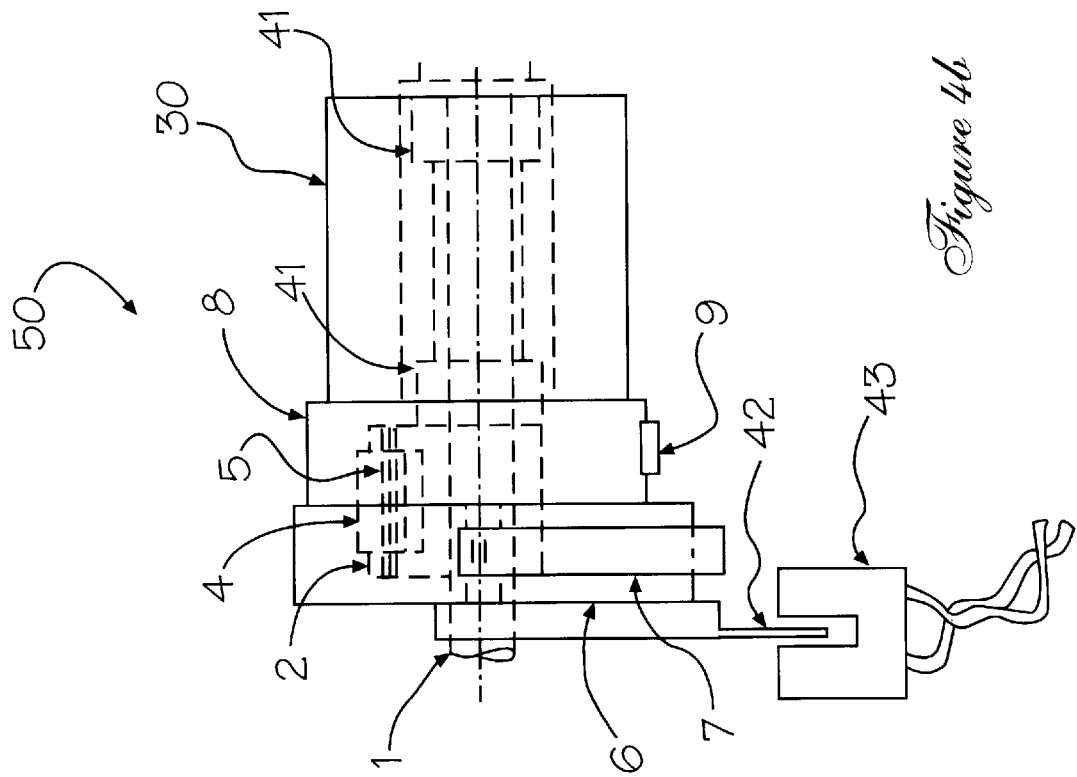
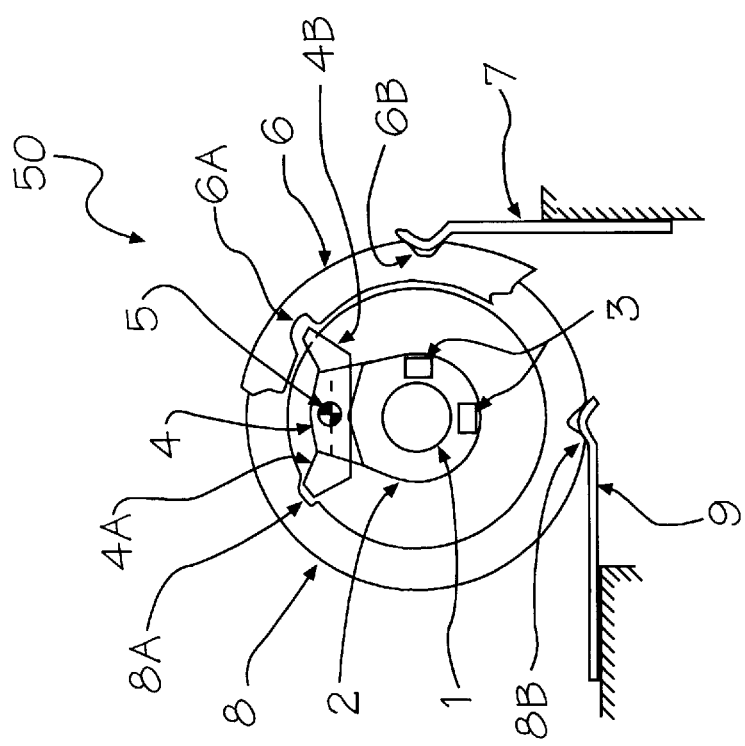

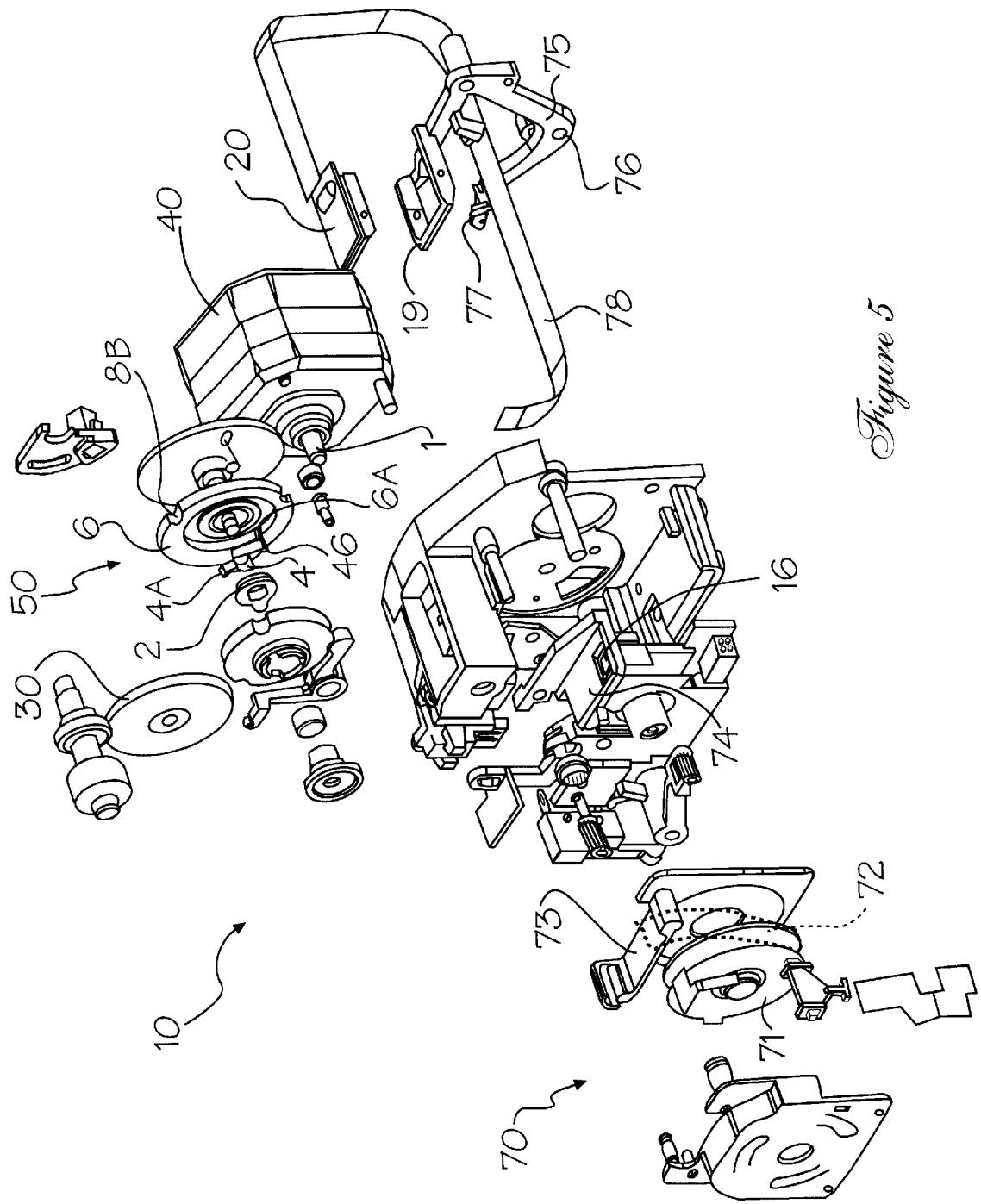

US 6,123,260

FLAGGING UNVERIFIED CHECKS COMPRISING MICR INDICIA

FIELD OF THE INVENTION

The present invention relates to a point-of-sale (POS) transaction printer and method and, more particularly, to a point-of-sale transaction printer having a thermal printer for imprinting a check with MICR characters and a MICR read head for reading and verifying the MICR indicia. A diagnostic program allows the machine to flag unverified checks by printing characters outside of the amount field, a bar code, or a line across the face of the check.

BACKGROUND OF THE INVENTION

In present day point-of-sale (POS) operations, the MICR indicia that are to appear on the check of a customer are added after the sale, and at a remote location (i.e., either at the bank, or in a separate, back room at the retail site).

For the first time, this invention seeks to eliminate the post-operative role of supplying the required MICR indicia on a check presented for POS payment at a retail establishment. Owing to its new function, machines now being designed by the present assignee of this invention, must be able to encode and read MICR characters located in a specific field (i.e., the amount field) of the check at the point-of-sale.

In a MICR encoder of the new machine, the MICR characters must be printed at a precise distance from the right edge of the check in order to place the MICR characters in the proper field site. In order to accomplish this, an optical sensor is provided to detect the edge of the check and stage it at a known location from the thermal, MICR print head. It then becomes a simple matter to advance the check by a stepper motor a fixed number of step increments in order to start the printing sequence at the proper position.

In addition, it is essential that the encoded MICR characters be verified after printing to assure their accuracy. The MICR indicia imprinted upon each check extend to each edge on the left and right of the check to within approximately 0.31 inches. Because of this proximity of the MICR printing to the edges of the check and the fact that a positive, steady drive of the check is required to ensure accurate reading of the MICR characters, a sophisticated drive system is required, capable of handling the check while reading MICR characters at either end of the check. Generally, a drive system with two sets of drive rollers has been employed. Because the plural drive stations should be synchronized, this has resulted in a bulky, sophisticated and, consequently, expensive solution to the problem.

The inventive MICR encoder for the transaction printer has overcome the complex drive system requirement by adding an additional MICR read head positioned in the document path at a position at which the newly-encoded amount field may be read (verified) while the document is being driven by the printer's single set of drive rolls. The second MICR read head is used to verify that the encoded amount field MICR characters are within specification.

Verified checks are processed normally. However, should the printed characters fail to be in specification, it is important for the retail establishment to know this, and to be able to identify the checks that fail. This is so, because most banks charge a substantial fee for finding and processing "bad" encodes made at the retailer. This is understandable because, regardless of where the encoding operation is performed, a "bad" encode may result in considerable effort in proofing the batch of checks. Most bad encodes result in a simple rejection failure (i.e., the check simply cannot be read) by the bank's check processing equipment. Certain encoding problems, however, result in a substitution failure (i.e., the successful reading of a character different from the encoded character, such as reading a "5" for an inscribed "2"). Since locating and resolving a substitution failure is a complex and time-consuming task, it is therefore imperative that the MICR encoding operation minimize problems which can result in substitution failures.

Two types of verifications are necessary in accordance with the check processing machine of this invention. The first verification determines whether there has been a media failure (i.e., whether the check is folded, wrinkled, mutilated, or has been poorly inserted into the check processing system). For example, it is common for a customer to remove a check from a wallet or billfold where the check has been folded one or more times. The second verification applies to system failures, wherein the media appears to be good, but the MICR read verification failed.

The inventive system and method of this invention flags the occurrence of a verification failure. The system inquires of the operator whether to proceed. The operator can answer "yes," if in the operator's opinion, the media was to blame for the failure. In such a case, the printer of the system continues to encode and verify subsequently inserted documents. Should it be determined that the media was not at fault, then the system provides a message that the encode function is no longer available, and that the operator should call a service representative. Regardless of the cause, however, there then appears in the system display, the message: "failure to verify." The message also includes the account number and the encoded dollar amount. The operator removes the flagged check and stores it in a separate bin for subsequent, special processing.

The flagging system and method of this invention ensures that the MICR encode system achieves the maximum uptime and performance, while allowing the retailer to segregate bad encodes from good encodes, thus avoiding large bank service charges.

SUMMARY OF THE INVENTION

In accordance with the present invention, there is provided a transaction printer for encoding and subsequently reading MICR indicia upon a check presented for payment at a point-of-sale. It is important to know whether the encoded indicia on a check being processed are within specification. The flagging of checks whose encodes cannot be verified is important to the retailer, in order to prevent the retailer from incurring additional bank processing fees. The present system flags checks as having failed verification when: (a) the media is bad (i.e., the check is wrinkled, worn, folded, etc.); and (b) the media appears to be good, but there exists a bad encode (i.e., the indicia are not within specification). The verification failure is flagged by the system, wherein the message: "failure to verify," is displayed on an operator's screen. Also displayed are the account number and the encoded dollar amount information. The operator is requested to inspect the check being processed. In the event that the media appears problematic, the operator can continue to encode and verify subsequently inserted documents. However, if the operator responds to the machine inquiry that the media appears to be good, this indicates the potential existence of an encoding problem. The operator is then instructed that the encoding function is no longer available, and that a service technician must be called. Subsequently, the retail establishment operator removes the failed check from the processing machine, and stores it in a separate bin for subsequent processing at a bank.

The fail-to-verify check may be periodically collected and handled in a variety of ways. For example, the check may each be inserted in a carrier envelope and new MICR information encoded on the lower portion of the carrier. In this case, all of the MICR information on the original check (i.e., the transit and on-us fields) must be re-encoded on the carrier document. Another way of handling a fail-to-verify check is to apply a special correction label over the amount field area of the check. A new amount field may then be re-encoded on the correction label. Sometimes this method requires the elimination the magnetic ink originally encoded on the document to avoid magnetic bleed-through.

It is an object of this invention to provide a transaction printer for encoding, reading, and verifying MICR indicia imprinted upon a check at a point-of-sale.

It is a further object of the invention to provide a transaction printer and method that can flag unverified checks and display an appropriate error message.

BRIEF DESCRIPTION OF THE DRAWINGS

A complete understanding of the present invention may be obtained by reference to the accompanying drawings, when considered in conjunction with the subsequent detailed description, in which:

FIGS. 4a and 4b illustrate respective, front cut-away and side views of a bi-directional clutch for driving the platen and print head arm lift cam, shown in FIGS. 1 through 3;

FIG. 5 depicts a perspective, exploded view of the check processing apparatus shown schematically in FIGS. 1 through 3, and including the bi-directional clutch illustrated in cutaway and side views in FIGS. 4a and 4b.

DESCRIPTION OF THE PREFERRED EMBODIMENT

Generally speaking, the invention features a transaction printer that encodes and reads MICR indicia at a point-of-sale. A sensor is provided in the MICR encoding machine to detect the edge of the check and allow precise registration of the check for subsequent MICR printing of the amount in the amount field of the check. The sensor also provides check location information to the control electronics for reading and verifying the encoded indicia. The system detects unverifiable checks and prompts the operator via a display to inspect the check being processed. Should the media of the check appear to be bad, then the encode function will still be available to the operator for subsequent checks, and the operator is instructed to save the unverified check for subsequent processing. Unverified checks are marked to prevent normal processing. If the operator determines that the media seems good, the operator keys this information into a control panel of the transaction printer, and the MICR encoding function may be disabled.

Figure 1:
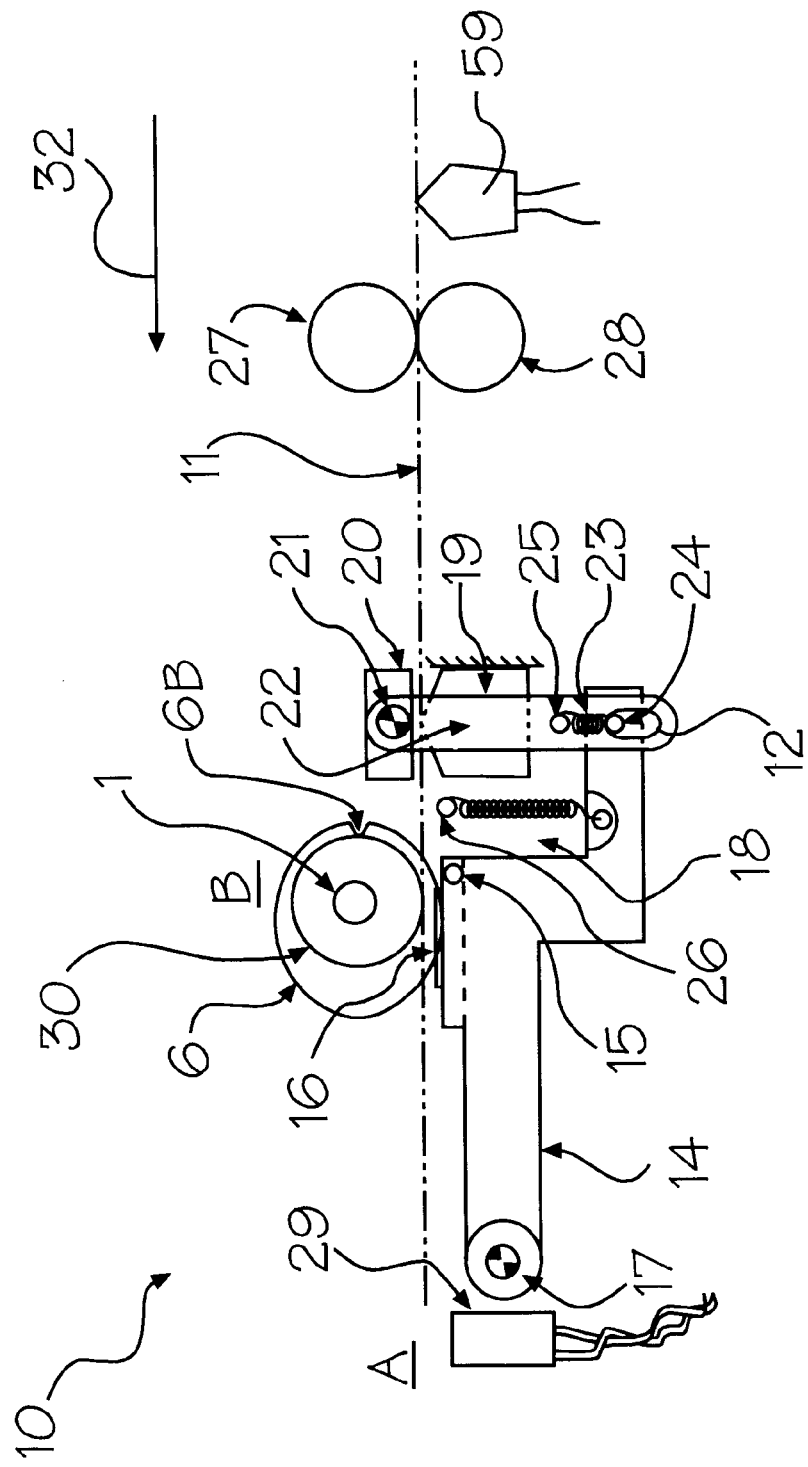
FIG. 1 illustrates a schematic view of a transaction printer in a first check handling position corresponding to the insertion of a check.

Referring to FIG. 1, a transaction printer, such as check processing apparatus 10, is shown. A check (not shown) is inserted into the check processing apparatus 10 at point A with a face down orientation. The check is fed into the apparatus 10, along the check feed path 11. The apparatus 10 is designed to encode the check with MICR indicia at the point-of-sale. To provide the MICR characters, a MICR encoder print head 16 is disposed along feed path 11. A MICR secondary read head 19, and a primary read head (not shown) are disposed along feed path 11. The read head (not shown) is used to verify the MICR characters imprinted in the amount field of the check. The primary read head (not shown) is used to read all of the other pre-existing MICR indicia in the assigned fields of the check. The engagement of the primary read head is controlled by a bi-directional clutch 50 (FIG. 5) in similar fashion as that of the secondary read head 19, as explained hereinafter.

A pressure pad 20 is located above the MICR read head 19. This pressure pad 20.presses the check, or other printed media, against the read head 19 to ensure good contact. A link 22 is connected to the pressure pad 20 through a pivot pin 21. A slot 12 at the distal end of the link 22 causes the link to be guided by link pin 24, which is fixedly attached to the end of the print head arm 14. The print head arm 14 is biased upwardly (arrow 33, FIG. 2) via spring 18 that is anchored to the housing pin 26. The pin 24, which rides in slot 12, is biased against the upper end of slot 12 by the tension spring 23 that is attached at its other end to pin 25. The spring 23 provides the contact force for pressure pad 20, as pin 24 moves away from pin 25 guided by the slot 12 in link 22. The check, or other media, is driven by feed rollers 27 and 28, which are part of the point-of-sale transaction printer, positioned to the rear of the check processing apparatus 10, but not shown here for brevity.

A reflective optical sensor 29, disposed at point A, stages the check for the various positions of the MICR print mechanism. In the home position 1, shown in FIG. 1, the cam 6 holds the print head 16 away from the platen 30 by bearing against pin 15. Pressure pad 20 is also held away from the MICR read head 19 in the home position, as previously mentioned. Therefore, a check or other media can now be inserted into the print zone B of the check processing apparatus 10. Feed rollers 27 and 28, which are normally separated, are now clamped together to grip the inserted check and feed it into the main printer unit for validation of account information on the check. The feed rollers 27 and 28 are rotated by a stepper motor (not shown). The check is driven back out (arrow 32), when validation is complete. The feed rollers 27 and 28 stop feeding the check when the lead edge of the check is detected by the reflective optical sensor 29 at point A. The check is now positioned for printing (encoding) of the MICR characters in the amount field of the check.

Figure 2:
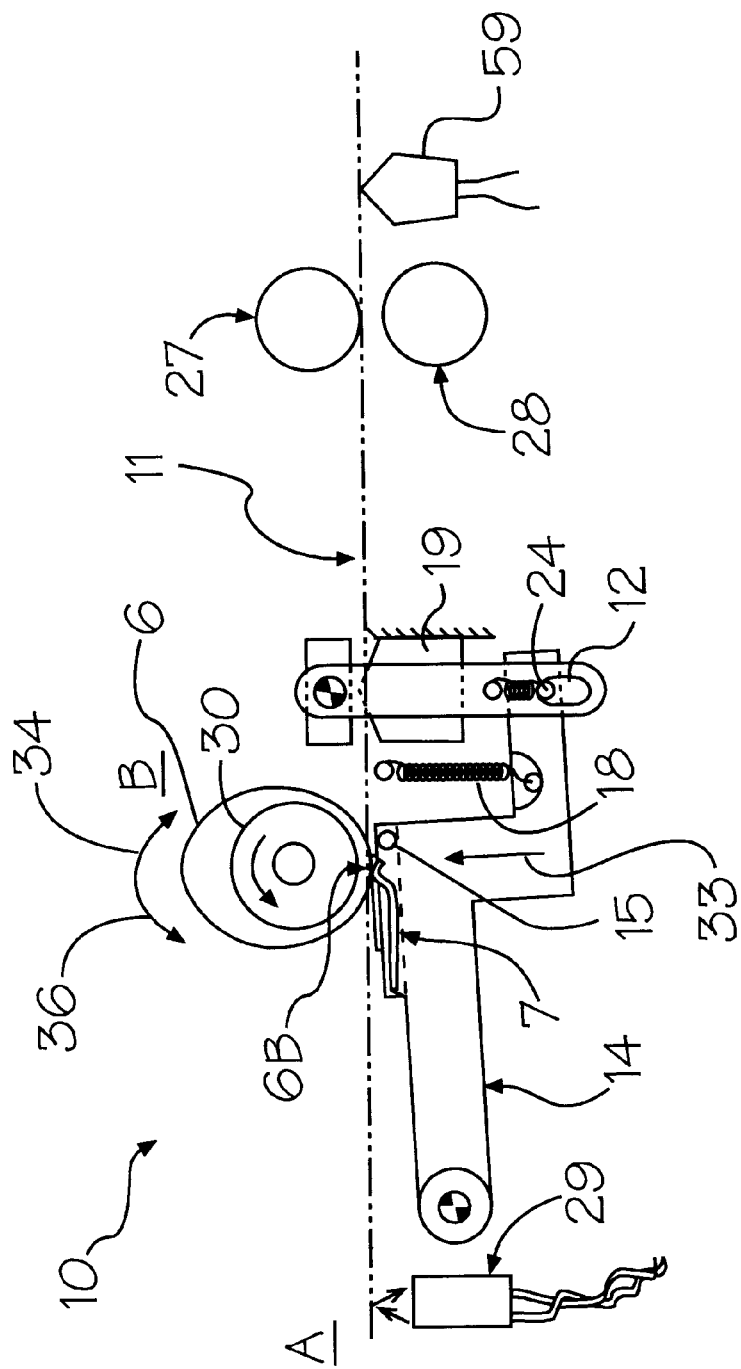
FIG. 2 depicts a schematic view of a transaction printer in a second check handling position corresponding to the MICR encoding of indicia thereupon.

Referring to FIG. 2, a second position of the transaction printer 10 is illustrated. In this position, also known as the MICR encode position, cam 6 rotates clockwise (arrow 34), so that there is now clearance between the cam 6 and pin 15. This allows the print head 16 to press a print ribbon (not shown) and the check against platen 30. A detent spring 7 engages in a suitable notch 6B in the cam 6, to hold the cam position. The cam 6 and platen 30 are both rotatively fixed upon the power input shaft 1. The cam 6 and platen 30 are selectively driven by the shaft 1, when the shaft 1 rotates either clockwise (arrow 34) to drive cam 6, or counterclockwise (arrow 36 FIG. 2) to drive the platen 30. This is accomplished by a bi-directional clutch mechanism (FIGS. 4a, 4b) disposed within the cam 6, explained hereinafter with reference to FIGS. 4a, 4b, and 5. The shaft 1 is driven in the counter-clockwise direction 36 (FIG. 2), in order to drive the platen 30 in the same direction. The edge of the check is detected by the reflective optical sensor 29 at point A. This commands the control electronics of the check processing apparatus 10 to start energizing the heater elements on the print head 16, which melts and transfers a wax-based ink from the ribbon to the check, thereby forming the MICR characters. The special ink contains magnetic particles which allow the subsequent "reading" of the characters both within the inventive check encoding system of the transaction printer or by other check processing equipment. It should be noted that feed rollers 27 and 28 are disengaged (opened), before platen 30 starts rotating. Pressure pad 20 and MICR read head 19 are also held apart.

Figure 3:
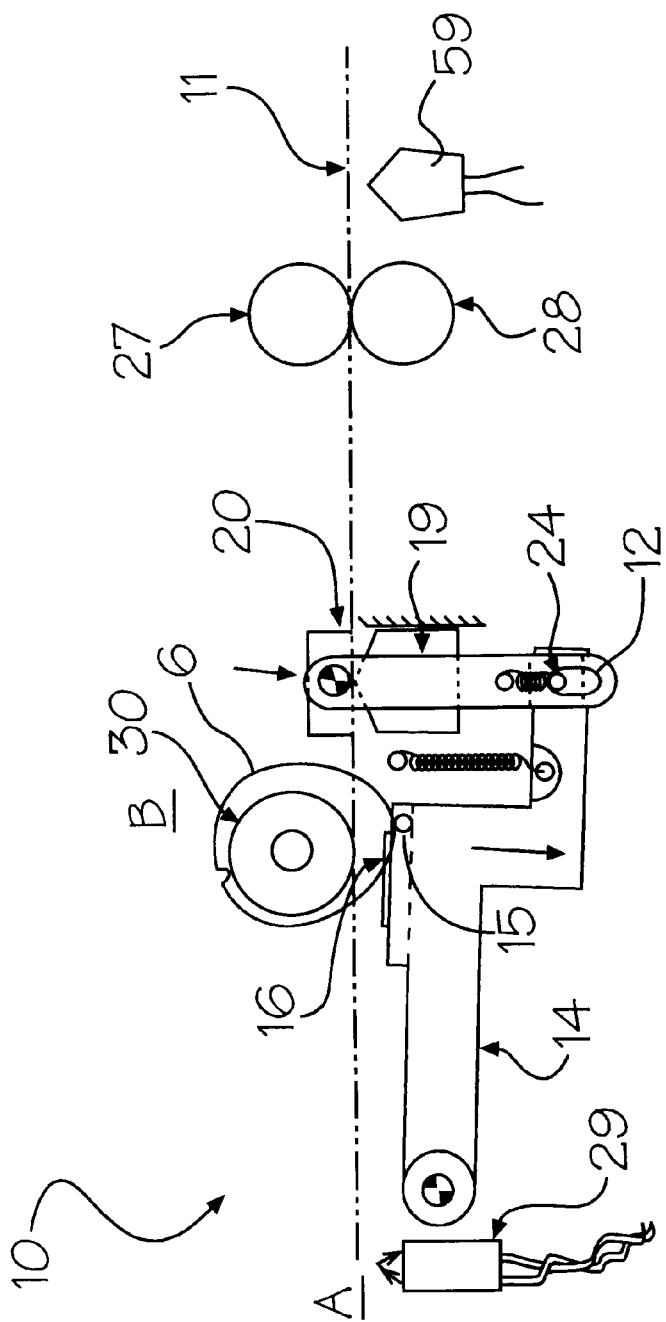
FIG. 3 shows a schematic view of a transaction printer in a third check handling position corresponding to reading of the imprinted MICR characters on the check.

Referring to FIG. 3, the third position of apparatus 10 is shown. In this position, the MICR indicia printed upon the check are read. Feed rollers 27 and 28 are again clamped together and grip the check after the MICR indicia has been printed. Power input shaft 1 rotates clockwise and drives the cam 6 half-way to its high point. In this position, there is clearance between the print head 16 and platen 30, and also between pressure pad 20 and the MICR read head 19. The check is then driven back out of the apparatus 10, where it is detected by the reflective optical sensor 29, which stops the feed rollers 27 and 28. Shaft 1 continues rotating clockwise and drives cam 6 to its high point against pin 15, and stops. This allows pressure pad 20 to contact and press the check against the MICR read head 19. Feed rollers 27 and 28 then drive the check past the MICR read head 19, which verifies the printed MICR characters. Cam 6 is then rotated clockwise back to position 1, so that there is again clearance between print head 16 and platen 30, and pressure pad 20 and the MICR read head 19. Feed rollers 27 and 28 then drive the check back out of the check processing apparatus 10, and present it to the operator. Feed rollers 27 and 28 open to allow removal of the check. The mechanism is now back at the home position (FIG. 1), and is ready for another point-of-sale transaction.

Now referring again to FIGS. 1, 2 and 3 as well as to FIGS. 4a and 4b, respective frontal cut-away, and side views are shown of the bi-directional clutch 50, which drives cam 6 and platen 30. A drive dog 2 is fixedly coupled to the input shaft 1 via set screws 3. A drive pawl 4 is pivotally attached to the drive dog 2 via pivot pin 5. The pawl tooth 4a ramps away from the angular detent surface of notch 8a disposed in clutch surface 8, when the shaft 1 is rotated in the clockwise direction (arrow 34, FIG. 2). The tooth 4a then engages in notch 6A disposed on cam 6. The cam 6 is normally held in position by leaf spring 7, which engages detent notch 6B. As the drive dog 2 continues to rotate in the clockwise direction (arrow 34), the detent force of leaf spring 7 is overcome, and the cam 6 rotates to the MICR encode position shown in FIG. 2.

The pawl tooth 4b ramps away from the angular detent surface 6A in cam 6, when the shaft 1 rotates in the counterclockwise direction (arrow 36, FIG. 2). The leaf spring 9, normally disposed in the detent 8B of the clutch surface 8, and which holds same in position, is overcome by the counter-rotative force, allowing the transaction printer 10 to achieve the MICR read position, shown in FIG. 3. The clutch 50 is driven by a stepper motor 40, the shaft 1 of which supports platen 30 via bearings 41, shown in FIG. 4b. An arm 42 attached to shaft 1 passes through an optical sensor 43, as shown. The optical sensor 43 detects a home position of stepper motor 40, and hence the position of the cam 6.

Referring to FIG. 5, an exploded, perspective view of the actual check processing apparatus 10 is shown. A cassette 70 contains a roll 71 of thermal ribbon 72. The ribbon 72 is moved across the stage 73 of cassette 70, as the roll 71 is rotated by shaft 1. The ribbon 72 is threaded through the printing stage 74. The platen 30, which is influenced by the bi-directional clutch 50, acts to control the encoding of MICR indicia by forcing the ribbon 32 into contact with the printing head 16.

The read head 19 comes into contact with the pad 20 via a pivot arm 75 that pivots about pivot 76. The pivot arm 75 has a finger 77 that rests in detent 8B. Movement of the bi-directional clutch 50 to the MICR read position forces the arm 75 to pivot, causing the read head 19 to come into contact with pad 20. The pivot arm 75 is biased against contact with pad 20 by leaf spring 78.

Figure 6:
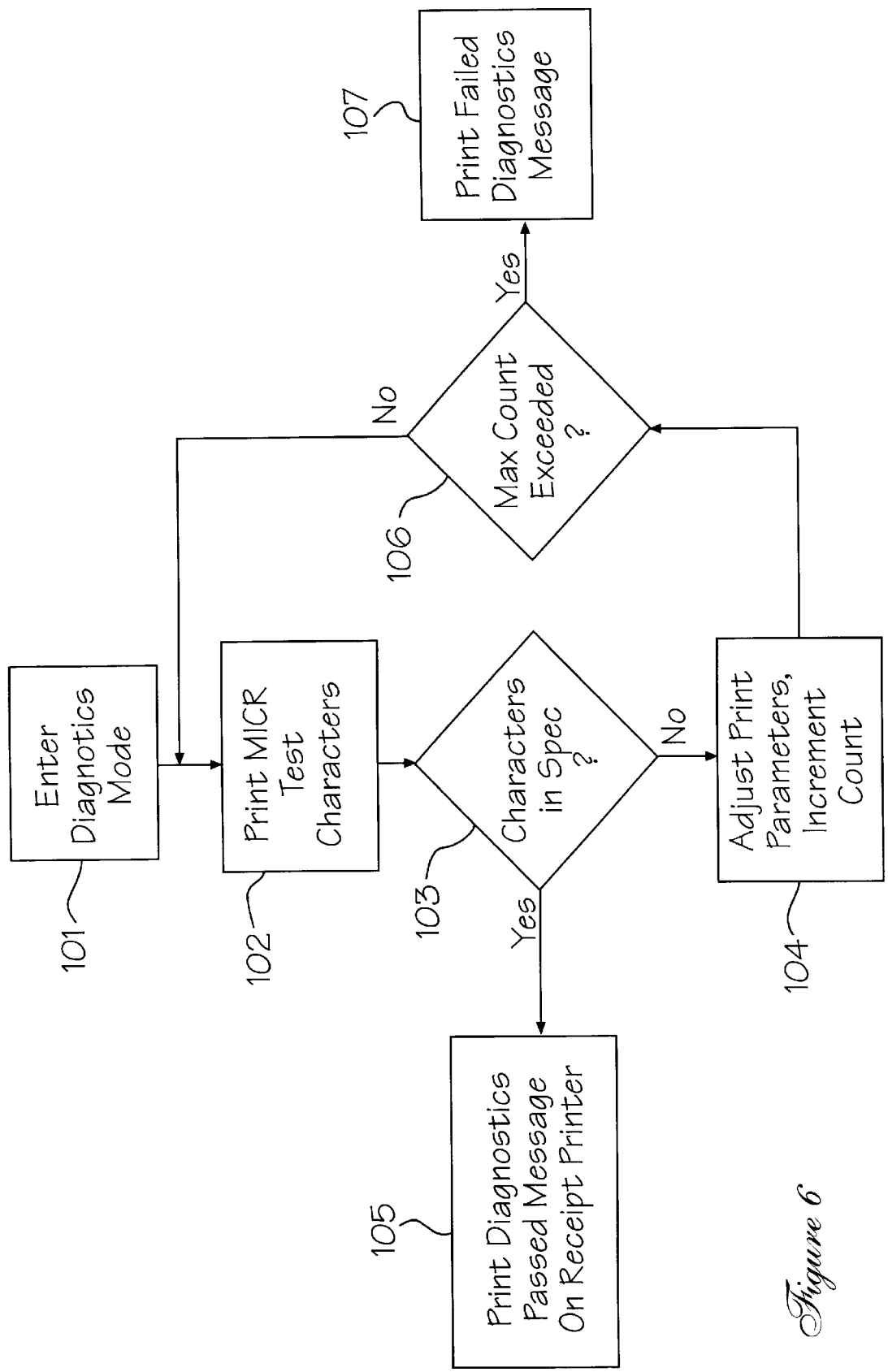
FIG. 6 shows a flow chart diagram illustrating the method used to flag unverifiable checks in the system of the transaction printer shown in FIG. 5.

Referring to FIG. 6, a flow chart 100 is shown featuring the method used to flag unverifiable checks read by the MICR read head 19 (FIG. 3). The method asks the operator to insert the check to be processed into the transaction printer, step 101. The request appears upon a screen of a control panel (not shown) of the transaction printer 10. The amount field is then encoded and the MICR characters are read, step 102. A check that contains MICR indicia within specification, and the media of which is valid, step 103, is processed in the usual manner, step 104. If the machine detects that the check is unverifiable, then the check may be marked, step 110, such as by printing stars outside of the amount field, a bar code, or a line across the face of the check. The operator is requested to remove the check from the printer 10 for inspection, step 105, as indicated by prompts displayed upon the control panel screen. After inspecting the check, the operator is requested to determine whether the media of the check appears satisfactory, (i.e., whether the check was wrinkled, mutilated, scored, folded, frayed, etc.). If the media was impaired, then the operator informs the machine 10 via a keyboard, selector switch, or selector button (not shown), that the media did not pass inspection, step 106. The operator is instructed to save the check in a separate bin designated for rejected checks. The machine then informs the operator, via the display, that the encode function is still valid, and that subsequent checks can be processed, step 109. If the operator determines that the media appears to be good, then the display informs the operator that the encode function is no longer available, step 107, and that he or she should call service personnel, step 108.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A transaction printer for encoding and reading MICR indicia upon a check at a point-of-sale, said transaction printer comprising:

means defining a check processing feed path;

means disposed along said check processing feed path for feeding said check therealong;

a MICR encoding zone disposed along said feed path, said MICR encoding zone comprising a print head for printing MICR indicia upon a check;

at least one MICR read head disposed along said feed path for reading imprinted MICR indicia; and verification means operatively connected to said at least one read head, for determining whether printed MICR indicia is within specification and, in response to an unverified read, providing a message to indicate an unverified check.

2. The transaction printer in accordance with claim 1, wherein said verification means comprises a program for instructing the operator.

3. The transaction printer in accordance with claim 1, wherein said verification means comprises means for displaying messages and information.

4. The transaction printer in accordance with claim 1, wherein said verification means comprises a selection means.

5. The transaction printer in accordance with claim 1, wherein said verification means comprises marking means for marking unverified checks.

6. A transaction printer for encoding and reading MICR indicia upon said check at a point-of-sale, said transaction printer comprising:

means defining a check processing feed path;

means disposed along said check processing feed path for feeding said check therealong;

a check encoding zone and at least one reading zone disposed along said feed path for imprinting and reading MICR indicia upon said check in order to verify said imprinted MICR indicia; and control means operatively connected to said check encoding zone and said at least one reading zone for verifying encoded MICR characters, and in response to an unverifiable MICR read, providing a flag message.

7. The transaction printer in accordance with claim 6, wherein said control means comprises means for marking an unverified check.

8. The transaction printer in accordance with claim 6, wherein said control means comprises a program for instructing the operator.

9. The transaction printer in accordance with claim 6, wherein said control means comprises a display screen for instructing the operator.

10. A method of processing a check at a point-of-sale, such that said check is encoded with MICR indicia, read and verified, the method comprising the steps of:

a) presenting a check at a point-of-sale to a transaction printer having MICR encoding and reading capability; and b) driving said check along a MICR encoding feed path to provide a sequential check processing operation, including the further steps of:

i) imprinting said check with MICR indicia;

ii) reading and verifying said MICR indicia imprinted upon said check; and iii) flagging an unverified check.

11. The method in accordance with claim 10, wherein the flagging an unverified check in step (b)(iii) comprises the step of:

c) imprinting said checks with at least one of the following: (i) stars outside an amount field of said check,( ii) a bar code, or (iii) a line across a face of said check.

* * * * *